United States Patent
Graney et al.

(10) Patent No.: US 9,534,153 B2
(45) Date of Patent: Jan. 3, 2017

(54) CARTON SEALING TAPE

(71) Applicant: Intertape Polymer Corp., Bradenton, FL (US)

(72) Inventors: Daniel Graney, Browns Summit, NC (US); John K. Tynan, Jr., Port Huron, MI (US); Michael Klauber, Simpsonville, SC (US); Trevor Arthurs, Truro (CA)

(73) Assignee: INTERTAPE POLYMER CORP., Sarasota, FL (US)

( * ) Notice: Subject to any disclaimer, the term of this patent is extended or adjusted under 35 U.S.C. 154(b) by 0 days.

(21) Appl. No.: 13/934,629

(22) Filed: Jul. 3, 2013

(65) Prior Publication Data

US 2014/0011024 A1 Jan. 9, 2014

Related U.S. Application Data

(60) Provisional application No. 61/668,613, filed on Jul. 6, 2012.

(51) Int. Cl.
*C09J 7/02* (2006.01)
*B32B 27/32* (2006.01)
(Continued)

(52) U.S. Cl.
CPC .......... *C09J 7/0296* (2013.01); *B29C 47/0021* (2013.01); *B29C 47/065* (2013.01); *B29C 47/92* (2013.01); *B32B 27/08* (2013.01); *B32B 27/20* (2013.01); *B32B 27/22* (2013.01); *B32B 27/32* (2013.01); *B32B 27/327* (2013.01); *B29C 2947/92152* (2013.01); *B29C 2947/92447* (2013.01); *B29C 2947/92647* (2013.01); *B29C 2947/92942* (2013.01); *B29K 2023/06* (2013.01);
(Continued)

(58) Field of Classification Search
CPC .. B32B 27/32; B32B 27/327; B32B 2250/242; B32B 2250/40; B32B 2307/518; B32B 2307/54; B32B 2307/51; B32B 2405/00; C09J 7/0296; C09J 2201/162; C09J 2201/606; C09J 2423/046; C09J 2423/106
See application file for complete search history.

(56) References Cited

U.S. PATENT DOCUMENTS 3,372,049 A 3/1968 Schaffhausen
4,137,362 A 1/1979 Miki et al.
(Continued)

FOREIGN PATENT DOCUMENTS

EP 0988147 11/2006

OTHER PUBLICATIONS

International Search Report and Written Opinion, PCT/US2013/049243 (Dec. 5, 2013).

*Primary Examiner* — Scott R Walshon
(74) *Attorney, Agent, or Firm* — Thompson Hine LLP (57) ABSTRACT

Carrier films, adhesive tapes including the carrier film, hand tearable carton sealing tapes, and methods of making the same are described. The carrier films include a first layer of a polyethylene, and a second layer of a polypropylene coextruded therewith and biaxially oriented therewith. This carrier film has a first major surface and a second major surface. A pressure sensitive adhesive may be disposed on the first major surface of the carrier film to make an adhesive tape. The first major surface may be defined by the layer of polypropylene.

20 Claims, 3 Drawing Sheets (51) Int. Cl.
*B32B 27/08* (2006.01)
*B32B 27/20* (2006.01)
*B32B 27/22* (2006.01)
*B29C 47/00* (2006.01)
*B29C 47/06* (2006.01)
*B29C 47/92* (2006.01)
*B29K 23/00* (2006.01)
*B29L 7/00* (2006.01)
*B29L 9/00* (2006.01)

(52) U.S. Cl.
CPC ...... *B29K 2023/12* (2013.01); *B29L 2007/007* (2013.01); *B29L 2009/00* (2013.01); *B32B 2250/03* (2013.01); *B32B 2250/242* (2013.01); *B32B 2250/40* (2013.01); *B32B 2264/102* (2013.01); *B32B 2264/104* (2013.01); *B32B 2307/51* (2013.01); *B32B 2307/518* (2013.01); *B32B 2307/54* (2013.01); *B32B 2405/00* (2013.01); *C09J 2201/162* (2013.01); *C09J 2201/606* (2013.01); *C09J 2423/046* (2013.01); *C09J 2423/106* (2013.01); *Y10T 428/2848* (2015.01); *Y10T 428/31913* (2015.04)

(56) References Cited

U.S. PATENT DOCUMENTS

| | | | |
|---|---|---|---|
| 4,229,241 A * | 10/1980 | Mueller | 156/243 |
| 5,145,718 A | 9/1992 | Pedginski et al. | |
| 5,306,745 A * | 4/1994 | Herran et al. | 523/205 |
| 5,366,796 A | 11/1994 | Murschall et al. | |
| 5,389,448 A | 2/1995 | Schirmer et al. | |
| 5,518,811 A | 5/1996 | Pedginski et al. | |
| 5,618,630 A * | 4/1997 | Benoit | B32B 27/32 428/500 |
| 5,804,024 A | 9/1998 | Bloch et al. | |
| 6,045,923 A | 4/2000 | Kok et al. | |
| 6,074,731 A | 6/2000 | Wilkie | |
| 6,124,032 A | 9/2000 | Bloch et al. | |
| 6,344,250 B1 * | 2/2002 | Arthurs | 428/34.9 |
| 6,387,529 B1 | 5/2002 | Peet | |
| 6,451,425 B1 * | 9/2002 | Kozulla et al. | 428/355 EN |
| 6,511,742 B1 | 1/2003 | Mussig et al. | |
| 6,565,793 B1 | 5/2003 | Goldsworthy et al. | |
| 6,638,637 B2 | 10/2003 | Hager et al. | |
| 6,706,392 B2 | 3/2004 | David et al. | |
| 6,770,360 B2 * | 8/2004 | Mientus et al. | 428/354 |
| 6,797,375 B1 | 9/2004 | Pearson et al. | |
| 6,908,672 B2 | 6/2005 | Wenninger et al. | |
| 7,083,840 B2 | 8/2006 | Monschein et al. | |
| 7,135,212 B2 | 11/2006 | Monschein et al. | |
| 7,186,458 B2 | 3/2007 | Pearson et al. | |
| 7,294,396 B2 | 11/2007 | Galle et al. | |
| 8,012,572 B2 * | 9/2011 | Ramli et al. | 428/216 |
| 8,043,696 B2 | 10/2011 | Chen et al. | |
| 8,105,686 B2 * | 1/2012 | Blackwell et al. | 428/355 AC |
| 2003/0072906 A1 | 4/2003 | Wenninger et al. | |
| 2003/0211350 A1 * | 11/2003 | Migliorini et al. | 428/515 |
| 2005/0069721 A1 | 3/2005 | Biasoli et al. | |
| 2005/0142370 A1 | 6/2005 | Mussig | |
| 2006/0234047 A1 | 10/2006 | Wenninger et al. | |
| 2007/0154706 A1 | 7/2007 | Mussig | |
| 2008/0199647 A1 * | 8/2008 | Blackwell et al. | 428/41.8 |
| 2010/0227136 A1 * | 9/2010 | Ramli et al. | 428/216 |
| 2011/0027552 A1 | 2/2011 | Rodewald et al. | |
| 2011/0129655 A1 * | 6/2011 | Suzuki et al. | 428/213 |
| 2011/0274961 A1 * | 11/2011 | Takita | B01D 67/0027 429/145 |

* cited by examiner

CARTON SEALING TAPE

RELATED APPLICATION

This application claims the benefit of U.S. Provisional Application No. 61/668,613 filed Jul. 6, 2012.

FIELD OF THE INVENTION

The present invention relates to an adhesive tape, more particularly a carton sealing tape having a film backing with decreased polypropylene content.

BACKGROUND OF THE INVENTION

Carton sealing tapes currently utilize mono- and bi-axially oriented polypropylene as a carrier. The carrier may also be referred to as a tape backing or substrate. Orientation may be achieved through either a double bubble blown process, a mono orienting cast line, or a biaxially orienting cast tenter line. The films can be composed of single or multiple layers. Each layer may consist of a homopolymer, copolymers, or blends of polypropylene.

The disadvantage of the current bi-axially oriented polypropylene (BOPP) films is that they are entirely dependent on polypropylene resins for their construction. As polypropylene (PP) is a by-product of the petroleum cracking industry, its production is dependent upon the production of polyethylene. As production of polyethylene (PE) transitions away from cracking of crude oil (heavies) to refining of natural gas (lights) and its collection by hydraulic fracking, the percentage of PP production decreases per unit of PE production, i.e. decreasing PP supply and increasing its price.

Polyethylene and polypropylene have been utilized in film manufacturing more than any other material. The vast assortment of molecular weights, densities, copolymers available within the respective families make these among the most versatile synthetic materials available for designing plastic articles such as film. PP and PE differ in their intrinsic thermal and mechanical characteristics. This frequently leads to the materials being utilized in order to exploit specific properties lacking in one but present in the other.

Accordingly, there is a need for improved film backings for carton sealing tapes, carton sealing tape itself, and films that include beneficial features and/or performance as a results of the combined use of PP and PE, such as improved tear properties and higher clarity.

Combining PE and PP together, as a blend or as discrete adjacent layers (as disclosed herein), is difficult because of the differences between the polymers. Additional measures are likely to be needed to produce the desired film. One factor making the integration of PE and PP into one film difficult is that PP and PE are not completely miscible.

Another level of complexity is encountered when a film, as proposed herein, contains both PP layers and PE layers. The complexity is especially noticeable when trying to biaxially orient a film that contains these layers. Polypropylene and polyethylene, separately, have been processed in a tenter, machine direction orientation (MDO), "double bubble," and virtually all these methods result in an oriented finished film. PP and PE, however, have inherent differences in melting temperature, crystallization rates, heat transfer properties, ultimate orientation ratio making simultaneous biaxial orientation thereof very difficult.

Film structures incorporating increasing levels of PE, as disclosed herein, in place of PP will exhibit lower heat resistance, which presents issues for downstream printing equipment that is designed to run PP. Moreover, the stretchability of PE is very limited compared to standard homopolymer PP biaxially-oriented polypropylene grades, which changes the yield stress required (the force required to stretch the film) and the stretch speeds (compare a speed of about 1.5 m/min for PE to about 30 m/min for PP). PE also has a narrower stretching window (due to the significantly lower melting point) that can only vary about 5° C. compared to PP which can vary by about 20° C. The narrow stretching window of PE is a significant limitation for commercial equipment.

Because the MDO process results in extremely large differences in machine direction (MD) and transverse direction (TD) properties, biaxially oriented films are preferred due to their superior balance of MD vs. TD tensile properties. Moreover, machine direction orientation is a component of the more complex biaxial process and occurs either simultaneously with transverse orientation or precedes TD orientation in a sequential (two-stage) tenter process. Biaxial orientation, as just discussed above, adds many levels of complexity to the formation of the films desired and disclosed herein. These difficulties surpass those encountered in films where only monoaxial stretching is utilized. Primarily due to reasons of product quality, the stretching ratios in the MD and TD can only be varied in relatively narrow limits. Stress-induced crystallization during the first orientation sequence necessitates polymer-specific adjustments to orientation temperature to achieve target stretch level. Since orientation equipment generally is designed for a fixed orientation ratio and is relatively inflexible in the transverse direction, hybrid films comprised of polymers having disparate orientation parameters would complicate the optimization of any commercial production of these structures.

Taking all these issues into account, it is no easy or obvious task to formulate a multilayer biaxially-oriented film having coextruded PE/PP layers such as the films disclosed herein.

SUMMARY OF THE INVENTION

One aspect of the invention are carrier films for adhesive tapes that include a core layer consisting essentially of a metallocene medium density polyethylene, low density polyethylene (LDPE), linear low density polyethylene (LLDPE), or combinations thereof, and a first layer of polypropylene coextruded with the core layer. The core and layer of polypropylene are biaxially oriented such that the carrier film has enhanced tear properties or higher clarity. In one embodiment, the core layer contributes about 40% to 90% weight of the carrier film based on the total weight thereof.

Another aspect of the invention are adhesive tapes having carrier films that include a core layer consisting essentially of a metallocene medium density polyethylene, low density polyethylene (LDPE), linear low density polyethylene (LLDPE), or combinations thereof, and a first layer of polypropylene coextruded with the core layer and has a layer of adhesive on a major surface thereof. The core and layer of polypropylene are biaxially oriented such that the carrier film has enhanced tear properties or higher clarity. In one embodiment, the core layer contributes about 40% to 90% weight of the carrier film based on the total weight thereof.

Depending upon the desired properties, the PE layer or the PP layer may include one or more compatibilizers to improve homogeneity and/or one or more additional polymer to increase the interlayer adhesion between the discrete PP/PE layers.

In one embodiment, the adhesive tape is a pressure sensitive adhesive tape such as a carton sealing tape having a pressure sensitive adhesive forming the adhesive layer. The adhesive layer is preferably applied to a first major surface of the carrier film defined by a first layer of polypropylene.

In another aspect of the invention, the carrier films and the adhesive tapes that include the carrier films have a film structure of an A/B/A construction or an A/B/C construction where A and C contain polypropylene and B contains polyethylene. In the A/B/A construction the first and second layers of polypropylene are the same in composition and both contribute the same amount to the weight percent of the total carrier film. In the A/B/C construction, the first and second polypropylene layers are different. They may be different in composition, their contribution to the weight percentage of the film, or both.

DETAILED DESCRIPTION

The following detailed description will illustrate the general principles of the invention, examples of which are additionally illustrated in the accompanying drawings. In the drawings, like reference numbers indicate identical or functionally similar elements.

As used herein, "adhesive tape" encompasses all sheet-like structures, such as two-dimensionally extended films or film sections, tapes with extended length and limited width, tape sections and the like, die cuts, labels, and another shape or construction that can have an adhesive on at least one major surface thereof.

One object of the adhesive tape is to limit the dependence upon polypropylene in oriented carton sealing tapes.

Another object of the adhesive tape is to have a carrier film having a reduced polypropylene content. This object may be achieved by providing a carrier film that is biaxially oriented and has coextruded polypropylene and polyethylene layers. In one embodiment, the carrier film has a coextruded A/B/A structure where B is a polyethylene layer and A and A are polypropylene layers and are same or an A/B/C structure where B is a polyethylene layer and A and C are polypropylene layers and A and C are different. These coextruded layers, after being coextruded, are preferably biaxially oriented (simultaneously, together) after extrusion. While the tapes herein are discussed with respect to a three layer film having an A/B/A or A/B/C type structure, the carrier film and tapes are not limited thereto. It is equally likely that the carrier film may have two, four, six, eight layers, etc. or five, seven, nine layers, etc. With today's technology and hereinafter developed technology, the number of layers in the carrier film are generally unlimited. For example, as seen in Tables 1 and 2 below, in one embodiment, the film has 5 or 7 layers and in another embodiment the film may have 27 layers, and can have any number of layers therebetween.

TABLE 1

| | 5-layer structure |
|---|---|
| Skin 5-10% | Polypropylene |
| Subskin 10-20% | Polyethylene |
| Core 10-20% | Polyethylene and reprocessed trim |
| Subskin 10-20% | Polyethylene |
| Skin 5-10% | Polypropylene |

TABLE 2

| | 7-layer structure | | 27 layer structure |
|---|---|---|---|
| Skin 5-10% | Polypropylene | Skin 5-10% | Polypropylene |
| Subskin 10% | Polypropylene | Subskin 10% | Polypropylene |
| Subskin 10-20% | | 1% Nano layer | 6 layers alternating PE |
| | Polyethylene | 1% Nano layer | 5 layers alternating PP |
| Core 10-20% | Polyethylene and reprocessed trim | Core 10-20% | Polyethylene and reprocessed trim |
| Subskin 10-20% | Polyethylene | 1% Nano layer | 5 layers alternating PP |
| | | 1% Nano layer | 6 layers alternating PE |
| Subskin 10% | Polypropylene | Subskin 10% | Polypropylene |
| Skin 5-10% | Polypropylene | Skin 5-10% | Polypropylene |

The 27 layer film was made utilizing a Cloeren, Inc. Nanolayer™ feedblock system. The Nano layers comprise a total of 10 layers of polypropylene at 1% vol/layer and 12 layers of polyethylene at 1% vol/layer in the total volume (or thickness) of the film. With the inclusion of nanolayers, the number of layers possible in the films is virtually unlimited.

Additionally, the films disclosed herein may include alternating layers of PE and PP. This may be most prevalent in the nano layers when present. The films may also include compatibilizing layers between any PE layer and adjacent PP layer. In another embodiment, any one or more of the layers may have a gradient of PP to PE within the layer. As such the content of the PE increases within that layer and will have the highest PE content near the surface that will be adjacent to a PE layer, and conversely, the content of the PP increases within that layer with the highest PP content near the surface that will be adjacent to a PP layer (i.e., the opposite surface from the one having the highest PE content). Preferably, the PP is the dominant resin in the outermost layers of the film, i.e., the outermost layers (each) contain more than 50% PP, or more than 60% PP, more than 70% PP, or more than 80% PP, or more than 90% PP. In one embodiment, the outermost layers both comprise about 100% PP. In another embodiment, when the outermost layers are predominantly PP, there are no ethylene based resins, homopolymer, copolymers, ter-polymers, etc., included therein.

Figure 1:
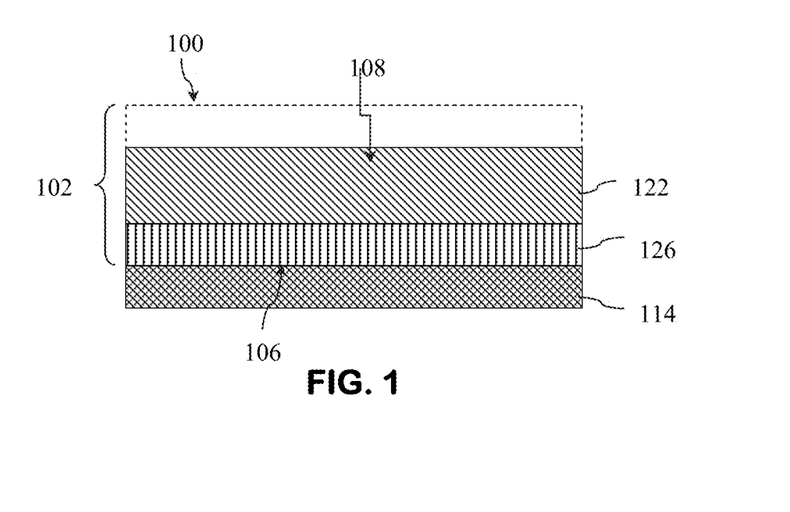
FIG. 1 is a cross-sectional view transverse to the longitudinal direction of an elongate sample of one embodiment of a carton sealing tape.

Referring now to FIG. 1, the tapes disclosed herein are generally referred to by the reference numeral 100. The tapes 100 include a carrier film 102 as the tape backing and an adhesive 114 applied to at least one major surface thereof. As illustrated in FIG. 1 the carrier film 102 has a first major surface 106 and a second major surface 108. The adhesive 114 in FIG. 1 is applied to the first major surface 106 of the carrier film 102. Tape 100 may be a carton sealing tape, but is not limited thereto.

Figure 2:
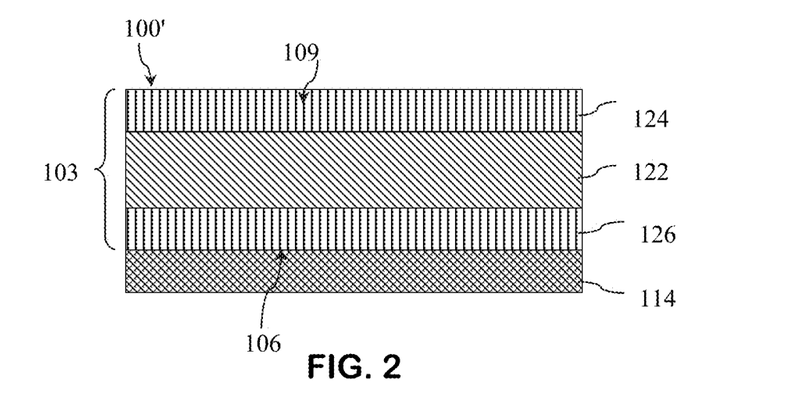
FIG. 2 is a cross-sectional view transverse to the longitudinal direction of an elongate sample of one embodiment of a carton sealing tape.

The carrier films are composed of a lower percentage of PP resins and an increased percentage of PE resin(s). In one embodiment, the carrier films have an A/B film construction where A is a polypropylene (layer 126 in FIG. 1), coextruded with a polyethylene B (core layer 122 in FIG. 1), which are thereafter biaxially oriented. The carrier film may be coextruded using standard equipment and conditions and/or hereinafter developed equipment, conditions, and methods. The coextruded film can either result in a cast film or a blown film that is biaxially stretched. Since these are coextruded films, no adhesive layers are necessary within the carrier films 102, 103 (FIGS. 1 and 2, respectively). Here, the polyethylene is about 0.5% to about 80% weight based on the total weight of the carrier film and the polypropylene makes up the balance.

In another embodiment, as shown in FIG. 2, the carrier film, generally designated 103, has an A/B/A or A/B/C construction, which are preferably coextruded, biaxially oriented films. That is, carrier film 103 includes two outer layers 124, 126 (A) or (A and C) and a core layer 122 (B). In one embodiment, the outer layers are compositionally equal (A) and are or include polypropylene. In another embodiment, the outer layers are compositionally different (A and C), but both are or include polypropylene. The core layer (B) is or includes polyethylene. The use of the words "polypropylene" and "polyethylene" herein refers to these substances in resin form.

The tape, generally designated 100' in FIG. 2, includes the carrier film 103 as the tape backing, which has an adhesive or adhesive layer 114 applied to at least one major surface thereof. As illustrated in FIG. 2 the carrier film 103 has a first major surface 106 and a second major surface 109. The adhesive 114 in FIG. 2 is applied to the first major surface 106 of the carrier film 102, but, alternatively, could be applied to the second major surface 109 or both surfaces if desired. Tape 100 may be a carton sealing tape, but is not limited thereto.

The core layer (B) in either of tapes 100 and 100' typically accounts for about 30% to about 90% weight or about 40% to about 90% weight based on the total weight of the carrier film and the two outer layers (A) combined account for the balance (about 70% to 10%) of the total weight of the film. In another embodiment, the PE is about 40% to about 80% weight based on the total weight of the carrier film. In another embodiment, the PE is about 50% to about 70% weight based on the total weight of the carrier film. In another embodiment, the PE is about 60% weight based on the total weight of the carrier film.

The contribution of the two outer layers (A) or (A and C) to the total weight of the film may be equal or unequal. For example, if the core accounts for 40% wt, then the two outer layers account for 60% wt of the film, which may be divided as 30% wt for each outer layer. Conversely, if the core accounts for 40% wt, then the balance may be divided unequally, for example as 20% wt for the first polypropylene layer and 40% for the second polypropylene layer or vice versa, or 10% wt for the first polypropylene layer and 50% for the second polypropylene layer or vice versa, or 15% wt for the first polypropylene layer and 45% for the second polypropylene layer or vice versa, etc.

Suitable polypropylene includes homopolymer, copolymers, ter-polymers, etc. of polypropylene resins. The polypropylene is typically an isotactic polypropylene, not a syndiotactic polypropylene. Accordingly, the outer layers (A) or (A and C) may be substantially free of syndiotactic polypropylene and will contain less than 3% wt of the total weight of the composition of the resulting film. In another embodiment, the outer layers (A) or (A and C) may be substantially free of syndiotactic PP by containing less than 1% wt syndiotactic PP based on the total weight of the composition of the resulting film. In another embodiment, the outer layers (A) or (A and C) may be substantially free of syndiotactic PP by containing less than 0.5% wt syndiotactic PP based on the total weight of the composition of the resulting film. The outer layers (A) or (A and C) may be substantially free of syndiotactic PP by containing less than 0.01% wt syndiotactic PP based on the total weight of the composition of the resulting film. In embodiments with more than three layers, any PP layers that are in direct contact with the core layer are at least substantially free of syndiotactic polypropylene as just explained above, especially when the core layer includes high density polyethylene (HDPE).

The polyethylene resins in the core layer and/or other additional layers may be or include, but not limited to, HDPE, linear medium density polyethylene (LMDPE), medium density polyethylene (MDPE), linear low density polyethylene (LLDPE), low density polyethylene (LDPE), very low density polyethylene (VLDPE), which encompasses ultra low density polyethylenes, ethylene vinyl acetate (EVA), ethylene methyl acrylate (EMA), ethylene vinyl alcohol (EVOH), Cyclic Olefin Copolymer (COC), and combinations thereof. Any one or more of the polyethylene resins included in a layer of the film may be metallocene resins (formed by a reaction catalyzed by metallocene) as often evidenced by an "m" preceding the resins acronym, for example mVLDPE, mLLDPE, etc. Suitable polyethylene resins are available from many manufacturers including Total Petrochemical and The Dow Chemical Company.

In one embodiment, the core layer includes PE, but does not include a HDPE or is substantially free of HDPE. The core layer is substantially free of HDPE if the PE compositions contains less than 2% wt of HDPE, or less than 1% wt of HDPE, or less than 0.5% wt HDPE, or less than 0.1% wt HDPE based on the total weight of the composition of the core layer.

The core layer, layer 122 in FIGS. 1 and 2, to provide appropriate properties for a carton sealing tape, preferably has a density of 0.935 $g/cm^3$ or less and has a melt index of about 1.0 g/10 min. In another embodiment, the core layer is or includes a metallocene medium density film resin that has a melt index of about 0.9 g/10 min and a density of about 0.934 $g/cm^3$. In another embodiment, the core layer is or includes a linear low-density PE for heavy duty applications that has a melt index of about 1.0 g/10 min and a density of about 0.920 $g/cm^3$. In another embodiment, the core layer is or includes a PE that has a melt index of about 1.0 g/10 min and a density of about 0.935 $g/cm^3$. The melt index for each PE was determined in accordance with ASTM D1238 and the densities were determined in accordance with ASTM D792.

The carrier films are preferably biaxially oriented films. The films may be oriented using standard equipment and conditions and/or hereinafter developed equipment, conditions, and methods. In one embodiment, a double bubble process may be used to biaxially orient the carrier film. The double bubble process may be carried out on a device such as that illustrated in FIG. 3 and described in more detail below. In another embodiment, the films may be oriented using a tenter frame and/or a machine-direction orientation process.

Figure 3:
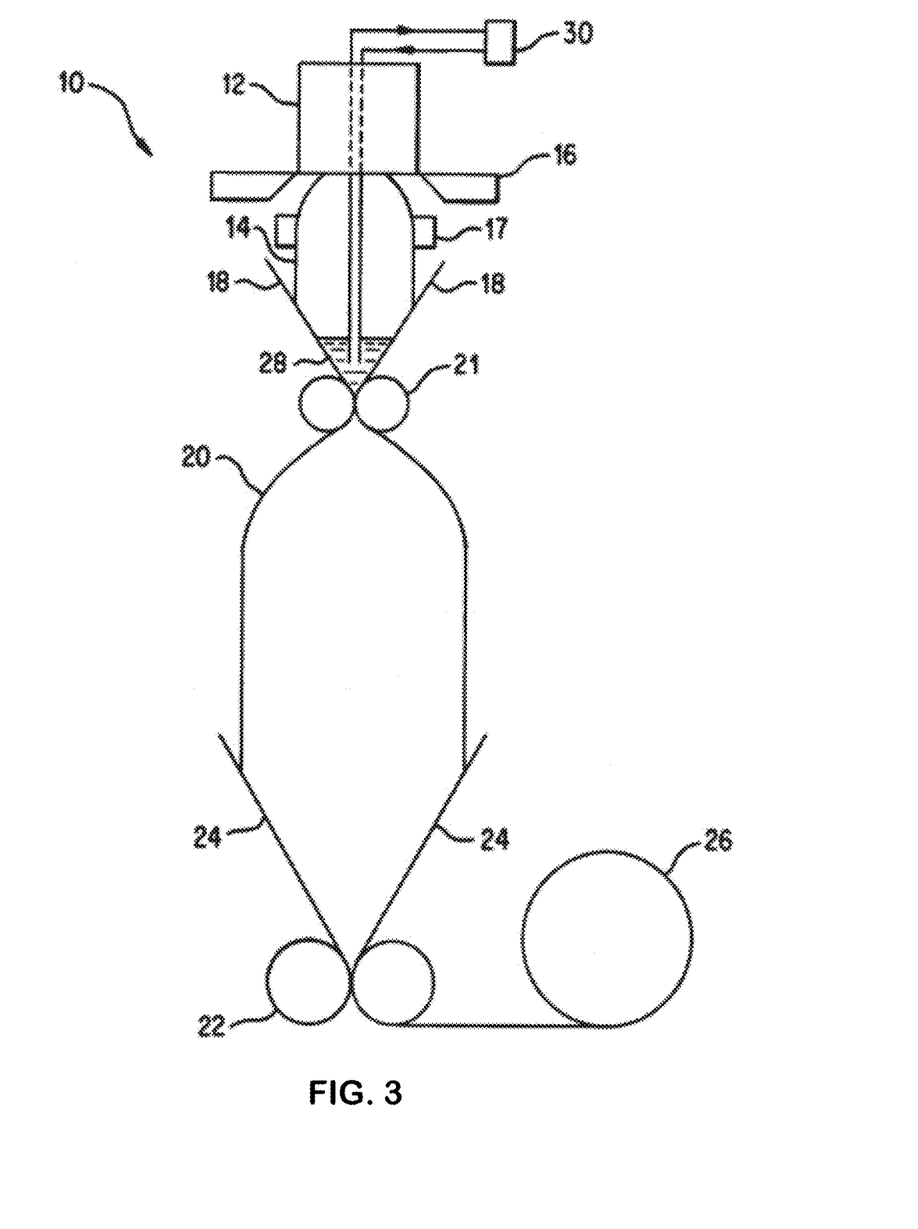
FIG. 3 is a schematic illustration of a portion of a double bubble device.

FIG. 3 shows schematically one device 10 available for making the multilayer PE/PP films disclosed herein. A single melt stream, or multiple melt streams including a first melt stream containing PP and a second melt stream containing PE are coextruded and exit as an extrudate through an annular die 12. The extruded film is hot blown to form a blown bubble 14.

Air cooling ring 16 positioned circumferentially around the blown bubble at the position shown cools the layers as they exit the die. An optional auxiliary chilling ring or rings 17 may also be positioned circumferentially around the blown bubble downstream from air cooling ring 16 to further chill the hot blown film.

The primary bubble 14 is melt oriented in both the machine and transverse directions. Various blow up ratios may be used, but preferably the primary bubble is hot blown to a blow up ratio of between 1.5 and 8.0.

The primary bubble 14 is collapsed at pinch rolls 21. To assist, guide plates 18 are positioned at the extremities of the blown bubble 14. The bubble may be immediately reinflated, after cooling, into the secondary bubble 20 and then expanded to impart orientation of the material primarily in the transverse direction, primarily in the longitudinal direction, or in both the transverse and longitudinal directions. Accordingly, the films produced by this process may be oriented in one direction (monoaxially oriented films) or films which are oriented in both the longitudinal and transverse directions (biaxially oriented films). The reinflation of the bubble may be accomplished by trapping air or other hot gases within the secondary bubble 20 so that the material stretches at its orientation temperature transversely to impart further orientation in the transverse direction. The secondary bubble 20 is collapsed at a second set of pinch rolls 22 and may include a second set of guide plates 24 to assist in the collapsing process. In one embodiment, the second set of pinch rolls 22 may be rotated at a speed faster than the first set of pinch rolls if it is desired to impart stretch orientation in the machine or longitudinal direction to the film.

Next, the recollapsed bubble passes from the second set of pinch rolls 22 to a take up roll 26. The take up roll 26 may be a mill log which can be immediately stored or shipped and/or processed into smaller rolls by a slitter.

The device in FIG. 3 may also include a reservoir 28 of heated fluid 30 disposed at the lower end of the primary bubble 14 in such a way that the collapsing material drawn through the primary set of pinch rolls 21 will pass in communication with the heated fluid. In this manner, the film is more uniformly heated and temperature control can be achieved.

Figure 4:
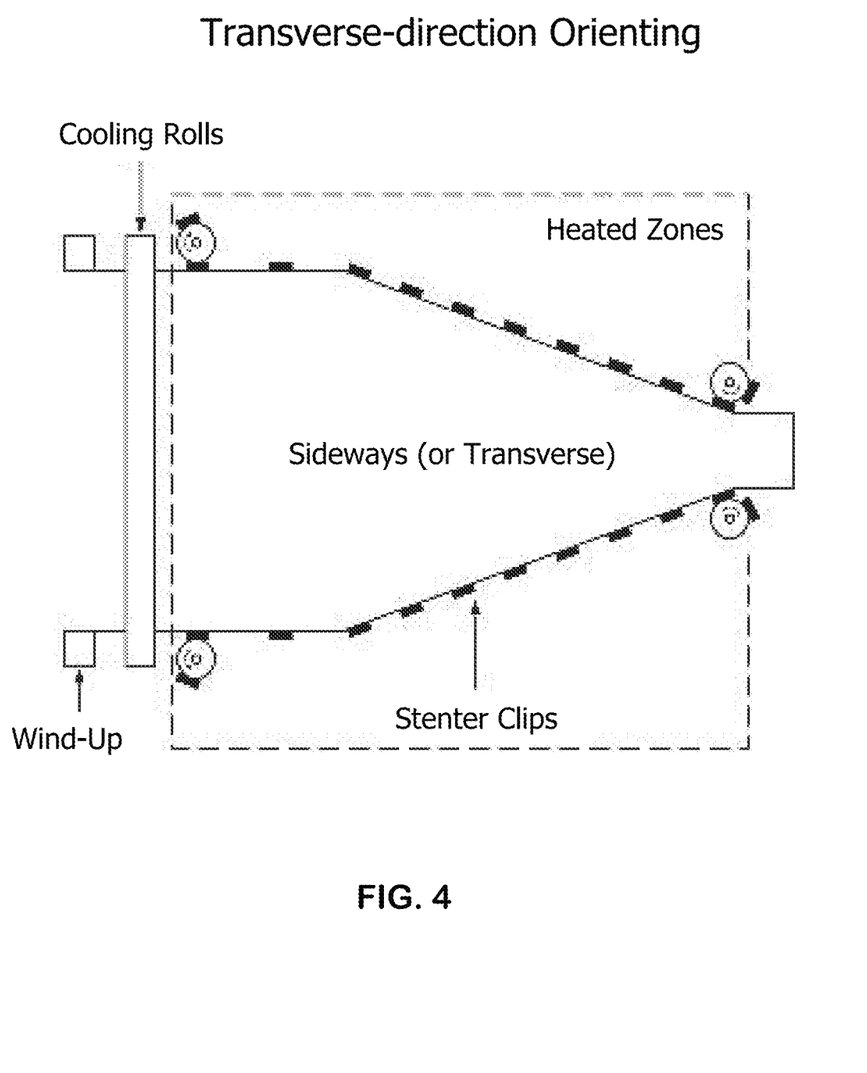
FIG. 4 is a schematic illustration of a tenter frame.

FIG. 4 is an illustration of a tenter frame. A film is fed into the tenter frame which consists of two divergent endless belts or chains fitted with clips. These clips grip the film so that as it travels, it is oriented in a transverse direction. The tentering area is heated, with accurate temperature control, usually by passing the film through an oven. Upon leaving the tenter frame, the film is cooled by passing over a series of cooling rollers, such that the stretch experienced by the film is retained. Thereafter, the film may be wound into rolls.

The resultant film is stretched from about 0.1-10 times to about 3-8 times, preferably from about 5-7 times in the machine direction, and from about 5 times to about 7 times, preferably from about 3 times to about 8 in the transverse direction.

The resultant film (the tape substrate without the adhesive layer) may have a thickness of about 10 microns to about 100 microns, preferably from about 15 microns to about 50 microns or about 20 microns to about 30 microns.

The adhesive layer 114, FIGS. 1 and 2, may be a pressure sensitive adhesive 114 applied to the first major surface 106 of the carrier film 102, 103, respectively. The adhesive layer 114 may be applied to carrier film (backing) 102, 103 as a solvent-cast, aqueous, solventless, or molten film or as a coating layer using either extrusion, any manner of roll, knife, rod, or blade coating, curtain coating or any suitable method. The adhesive layer can be cross-linked by means of heat or radiation and can if desired be lined with a release film or release paper. In one embodiment, the adhesive coating layer thickness may range from about 0.1 mil to about 2.5 mil.

Pressure sensitive adhesives (PSA) are elastomeric-based adhesives that "wet out" at room temperature. When pressure is applied to the adhesive, they become flowable thereby covering the substrate. As the pressure is removed adhesion takes place. Typical varieties of PSAs are derived from natural rubber, synthetic rubber, acrylic, silicone and modifications thereof. The following adhesive compounds, solutions, or emulsions may be used, either alone or in combination, without departing from the scope of this invention. Rubber based adhesives such as, but not limited to, natural rubber, synthetic polyisoprene, styrene-isoprene-styrene block copolymer (SIS), styrene-butadiene-styrene block copolymer (SBS), styrene-ethylene-butylene-styrene block co-polymer (SEBS), styrene-ethylene-propylene-styrene block copolymer (SEPS), styrene butadiene rubber, nitrile rubber, neoprene rubber, butyral and butyl rubber, polyisobutylene, polysulfide rubber, silicone rubber, natural latex rubber, and synthetic latex rubber. Resin-based adhesives such as, but not limited to, polyvinyl acetate, polyvinyl butyral, polyvinyl chloride, acrylic, ethylene vinyl acetate, polyethylene-based, polyolefin based, nylon-based, phenol-based (including formaldehyde-based), urea-based (including formaldehyde-based), epoxy resin, polyurethane-based, rosin-based (including rosin esters), polyterpene-based, polyester, petroleum based, and low molecular weight based adhesives. Inorganic adhesives such as, but not limited to, silicate adhesive and wax adhesives such as, but not limited to, paraffin, natural wax, and bees wax.

In one embodiment, the adhesive may be a heat activated adhesive.

The adhesives disclosed above may include one or more additives such as tackifiers (resins), plasticizers, fillers, pigments, ultraviolet (UV) absorbers, light stabilizers, aging inhibitors, crosslinking agents, crosslinking promoters.

Tackifiers are, for example, hydrocarbon resins (for example, those of unsaturated $C_5$ or $C_7$ monomers), terpene-phenolic resins, terpene resins formed from raw materials such as α- or β-pinene, aromatic resins such as coumarone-indene resins or resins of styrene or α-methylstyrene, such as rosin and its derivatives, such as disproportionated, dimerized or esterified resins, in which context it is possible to use glycols, glycerol or pentaerythritol. Particularly suitable are aging-stable resins without an olefinic double bond, such as hydrogenated resins, for example.

Examples of suitable fillers and pigments are carbon black, titanium dioxide, calcium carbonate, zinc carbonate, zinc oxide, silicates or silica.

Suitable UV absorbers, light stabilizers, and aging inhibitors for the adhesives are those as listed in this specification for the stabilization of the film.

Examples of suitable plasticizers include aliphatic, cycloaliphatic, and aromatic mineral oils, diesters or polyesters of phthalic acid, trimellitic acid or adipic acid, liquid rubbers (for example, nitrile rubbers or polyisoprene rubbers), liquid polymers of butene and/or isobutene, acrylic esters, polyvinyl ethers, liquid resins and plasticizer resins based on the raw materials for tackifier resins, wool wax and other waxes, or liquid silicones.

Examples of crosslinking agents are phenolic resins or halogenated phenolic resins, melamine resins and formaldehyde resins. Examples of suitable crosslinking promoters are maleimides, allyl esters such as triallyl cyanurate, and polyfunctional esters of acrylic and methacrylic acid.

In one embodiment, the pressure-sensitive adhesive is or includes acrylate PSAs (for example in dispersion form) or PSAs comprising styrene block copolymer and resin (for example, of the kind typical for hot melt PSAs). In another embodiment, the pressure-sensitive adhesive is or includes a natural rubber.

Barrier layers and release layers, may optionally be added to the tape construction. The release layer (not shown), for example a silicone release coating, may be applied to the second major surface 108 (FIG. 1) or 109 (FIG. 2) of the backing, which is the side opposite the adhesive layer 114 such that it will allow the tape to be self-winding into roll form. The release layer is not limited to a silicone release coating, but may be any other suitable release system known to one of skill in the adhesive and/or tape art or developed hereafter.

The thickness of barrier layers and release layers may be minimized relative to the backing and the adhesive by applying them via any of the conventional printing, coating or air-brushing techniques known in the art. Thickness is one mechanism for maintaining the aesthetics and the performance of the adhesive tape and minimizing the direct material cost thereof.

The resultant adhesive tapes may have a thickness of about 0.5 mils to about 5.0 mils, preferably from about 1.0 mils to about 4.0 mils or about 1.4 mils to about 3.8 mils (adhesive and carrier film thicknesses added together).

EXAMPLES

Biaxially oriented carrier film comprising ABA or ABC constructions were made and tested in comparison to currently available biaxially oriented polypropylene films (BOPP films). The BOPP films were an A/A/A film having three PP homopolymer layers. One of the BOPP films was a cast film and the other was a blown film. These films were used as controls for comparison to the inventive films, Film 1, Film 2, and Film 3 in the table below.

The biaxially oriented carrier films, Films 1-3, were made by extruding homopolymer polypropylene and polyethylene utilizing two extruders in an A-B-A configuration. The A extruder processed the polypropylene, which was an isotactic PP. The B extruder processed the polyethylene core identified in Table 3 below. The polymer melt consisting of PP and PE was delivered to an annular die, and the double bubble orientation process (described above) was used to produce the films. The biaxially films were stretched to have an orientation ratio of about 6.5×6.5 (MD×TD). Then the films were tested to determine the properties listed in Table 3.

TABLE 3

|  | Inventive Film 1 | Inventive Film 2 | Inventive Film 3 | BOPP Film (Cast) Control | BOPP Film (Blown) Control |
| --- | --- | --- | --- | --- | --- |
| CORE | LMDPE D = 0.935 MI = 1.0 g/ 10 min | LMDPE D = 0.934 MI = 0.9 g/ 10 min | HDPE MI = 0.45 g/ 10 min | Total 3371 MFI = 2.8 | Total 3276 MFI = 2.0 |
| Film Weight (gsm) | 21.8 | 21.2 | 19.4 | 21.9 | 21.7 |
| Film Caliper (micron) | 24.8 | 23.1 | 23.6 | 24.0 | 24.5 |
| Tensile (PSI) Machine Direction | 15.5 | 14.7 | 15.7 | 20.9 | 23.7 |
| Elongation (%) Machine Direction | 125.8 | 112.9 | 102.2 | 203.6 | 166.3 |
| 2% Secant Modulus (PSI) Machine Direction | 56756.7 | 72577.3 | 115428.8 | 165335.5 | 126090.7 |
| Tensile (PSI) Cross Direction | 11.5 | 10.8 | 11.1 | — | — |
| Elongation (%) Cross Direction | 62.7 | 60.5 | 70.4 | — | — |
| 2% Secant Modulus (PSI) Cross Direction | 93310.9 | 77091.6 | 79968.7 | — | — |
| Elmendorf (g) Machine Direction | 26 | 25 | 13 | 18 | 22 |
| Elmendorf (g) Cross Direction | 36 | 30 | 27 | 34 | 42 |

D = density;
MFI = melt flow index

The carrier films and/or the tapes made therefrom may be cut, trimmed as needed, and wound onto a core to form a roll of film or a roll of adhesive tape.

Utilization of the inventive films in the manufacture of hot melt pressure sensitive adhesive and emulsion acrylic tapes showed an overall performance acceptable for a commercially acceptable adhesive tape, especially as a carton sealing tape. The results of various tests on the tapes made using Film 1 and Film 2 are included in Table 4 below.

TABLE 4

|  | Tape made from Film 1 | Tape made from Film 2 | BOPP Film (Cast) Control | BOPP Film (Blown) Control |
|---|---|---|---|---|
| adhesive type | Hot melt | Hot melt | Hot melt | Hot melt |
| Total thickness (mils) | 1.57 | 1.49 | 1.56 ± 0.12 | 1.46 ± 0.12 |
| Film thickness (microns) | 24.24 | 21.87 | 25.0 ± 1.5 | 22.0 ± 1.5 |
| Adhesive Coat weight (gsm) | 14.6 | 14.76 | 14.5 ± 1.5 | 14.5 ± 1.5 |
| Rolling ball test (cm) | 2-3 | 3-3 | <12 | <12 |
| Peel Adhesion (g/inch) ASTM D3330 | 725 | 750 | ≥600 | ≥600 |
| Holding Power (min.) ASTM D3654 (0.5" × 0.5" × 1 Kg) | 1808 | 1831 | ≥900 | ≥900 |

Automatic tape dispenser testing of tapes manufactured with the inventive film in a manufacturing plant showed no negative impact on dispensing or carton sealing performance. Moreover, surprisingly and unexpectedly, the inventive film tapes are hand tearable. On the contrary, standard BOPP carton sealing tapes are not. Hand tearability is an advantage for the end user because it makes the use of a cutting device unnecessary.

It will be appreciated that while the invention has been described in detail and with reference to specific embodiments, numerous modifications and variations are possible without departing from the spirit and scope of the invention as defined by the following claims.

What is claimed is:

1. A carrier film for an adhesive tape comprising:
an outermost layer containing about 50% to 100% of a polypropylene therein;
an adhesive-receiving layer containing about 50% to 100% of a polypropylene therein; and
a core layer consisting essentially of a polyethylene selected from the group consisting of linear medium density polyethylene, medium density polyethylene, metallocene resins thereof, and combinations thereof, the core layer being positioned between the outermost layer and the adhesive-receiving layer;
wherein the outermost layer, the core, and the adhesive-receiving layer are coextruded and;
are biaxially oriented;
wherein the outermost layer and the adhesive-receiving layer are the same or different, and the polyethylene is about 40% to about 80% weight based on the total weight of the carrier film;
wherein the carrier film has an elongation in the machine direction that is from greater than 100% to about 126% and a tensile modulus in the machine direction of about 14.7 psi (0.101 MPa) to about 15.5 psi (0.107 MPa).

2. The carrier film of claim 1, wherein the polyethylene in the core layer is a homopolymer.

3. The carrier film of claim 1, wherein the polyethylene in the core layer has a density of about 0.93 g/cm³ and a melt index of about 0.9 g/10 min or about 1 g/10 min.

4. The carrier film of claim 1, further comprising subskin layers between the outermost layer and the core layer and between the adhesive-receiving layer and the core layer.

5. The carrier film of claim 1, further comprising one or more nanolayers of polyethylene or polypropylene between the outermost layer and the core layer.

6. The carrier film of claim 5, wherein the nanolayers include a plurality of alternating polyethylene layers and polypropylene layers.

7. The carrier film of claim 1, wherein the adhesive-receiving layer has no ethylene based resins included therein.

8. The carrier film of claim 7, wherein the polypropylene in the adhesive receiving layer and in the outermost layer are both a homopolymer, and the polyethylene in the core layer is a homopolymer.

9. An adhesive tape comprising:
a carrier film having a first major surface and a second major surface, the carrier film comprising:
an adhesive-receiving layer containing about 50% to 100% of a polypropylene therein defining the first major surface;
an outermost layer containing about 50% to 100% of a polypropylene therein defining the second major surface; and
a core layer consisting essentially of a polyethylene selected from the group consisting of linear medium density polyethylene, medium density polyethylene, metallocene resins thereof, and combinations thereof, the core layer being positioned between the outermost layer and the adhesive-receiving layer;
wherein the outermost layer, the core layer, and the adhesive-receiving layer are coextruded and biaxially oriented;
wherein the polypropylene in the outermost layer and the adhesive-receiving layer are the same or different, and the polyethylene is about 40% to about 80% weight based on the total weight of the carrier film;
wherein the carrier film has an elongation in the machine direction that is from greater than 100% to about 126% and a tensile modulus in the machine direction of about 14.7 psi (0.101 MPa) to about 15.5 psi (0.107 MPa); and
an adhesive layer on the first major surface of the carrier film.

10. The adhesive tape of claim 9, wherein the adhesive in the adhesive layer is or includes a pressure sensitive adhesive.

11. The adhesive tape of claim 9, wherein the polyethylene in the core layer has a density of about 0.93 g/cm³ and a melt index of about 0.9 g/10 min or about 1 g/10 min.

12. The adhesive tape of claim 9, further comprising subskin layers between the outermost layer and the core layer and between the adhesive-receiving layer and the core layer.

13. The adhesive tape of claim 9, further comprising one or more nanolayers of polyethylene or polypropylene between the outermost layer and the core layer.

14. A hand tearable carton sealing adhesive tape comprising:
- a carrier film having a first major surface and a second major surface, the carrier film comprising:
  - an adhesive-receiving layer containing about 50% to 100% of a polypropylene therein defining the first major surface;
  - an outermost layer containing about 50% to 100% of a polypropylene therein defining the second major surface; and
  - a core layer consisting essentially of a polyethylene selected from the group consisting of linear medium density polyethylene, medium density polyethylene, metallocene resins thereof, and combinations thereof, the core layer being positioned between the outermost layer and the adhesive-receiving layer;
- wherein the outermost layer, the core layer, and the adhesive-receiving layer are coextruded and biaxially oriented;
- wherein the polypropylene in the outermost layer and the adhesive-receiving layer are the same or different, and the polyethylene is about 40% to about 80% weight based on the total weight of the carrier film;
- wherein the carrier film has an elongation in the machine direction that is from greater than 100% to about 126% and a tensile modulus in the machine direction of about 14.7 psi (0.101 MPa) to about 15.5 psi (0.107 MPa); and
- an adhesive layer on the first major surface of the carrier film.

15. The hand tearable carton sealing adhesive tape of claim 14, wherein the adhesive in the adhesive layer is or includes a pressure sensitive adhesive.

16. The hand tearable carton sealing adhesive tape of claim 14, wherein the polyethylene in the core layer includes a linear medium density polyethylene and the polypropylene in the adhesive-receiving layer is a homopolymer.

17. The hand tearable carton sealing adhesive tape of claim 16, wherein the polyethylene in the core layer consists of a linear medium density polyethylene.

18. The hand tearable carton sealing adhesive tape of claim 14, wherein the polyethylene in the core layer has a density of about 0.93 $g/cm^3$ and a melt index of about 0.9 g/10 min or about 1 g/10 min.

19. The hand tearable carton sealing adhesive tape of claim 14, further comprising subskin layers between the outermost layer and the core layer and between the adhesive-receiving layer and the core layer.

20. The hand tearable carton sealing adhesive tape of claim 14, further comprising one or more nanolayers of polyethylene or polypropylene between the outermost layer and the core layer.

* * * * *